US012779992B2

(12) United States Patent
Ive et al.

(10) Patent No.: US 12,779,992 B2
(45) Date of Patent: Nov. 3, 2026

(54) CONTROL PANEL WITH A REVERSIBLE SCREEN FOR A VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James Mcgrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Maximilian Romani, Modena (IT); Vito Conigliaro, Modena (IT); Matteo Lanzavecchia, Modena (IT)

(73) Assignee: FERRARI S.P.A., Modena (IT)

( * ) Notice: Subject to any disclaimer, the term of this patent is extended or adjusted under 35 U.S.C. 154(b) by 381 days.

(21) Appl. No.: 18/498,579

(22) Filed: Oct. 31, 2023

(65) Prior Publication Data

US 2024/0149674 A1 May 9, 2024

(30) Foreign Application Priority Data

Nov. 4, 2022 (IT) ........................ 102022000022764

(51) Int. Cl.

*B60K 35/00* (2024.01)
*B60K 35/10* (2024.01)
*B62D 1/04* (2006.01)

(52) U.S. Cl.

CPC .............. *B60K 35/00* (2013.01); *B60K 35/10* (2024.01); *B60K 2360/126* (2024.01);

(Continued)

(58) Field of Classification Search

CPC .. B60K 35/00; B60K 35/10; B60K 2360/126; B60K 2360/28; B60K 2360/698;

(Continued)

(56) References Cited

U.S. PATENT DOCUMENTS 459,140 A * 9/1891 Kronenberg ............. A63H 1/32 446/244
2,309,941 A * 2/1943 Drummond ............ B60K 37/20 116/299

(Continued)

FOREIGN PATENT DOCUMENTS

DE 3339613 A1 * 5/1985
DE 4445826 A1 * 6/1996

(Continued)

OTHER PUBLICATIONS

DE-3703127-C2; Kleinboehl “Controls”, 1989. (Year: 1989).*

(Continued)

*Primary Examiner* — Brandi N Hopkins
*Assistant Examiner* — Tania Courson
(74) *Attorney, Agent, or Firm* — CANTOR COLBURN LLP

(57) ABSTRACT

A control panel for a vehicle and comprising: a flat main body having at least one first through opening, which is obtained inside it and is completely surrounded by the flat main body; and a flat secondary body, which has the same (Continued)

shape and the same size as the first through opening of the main body, has a first face and a second face opposite one another, and is arranged in the area of the first through opening of the main body. The flat secondary body is mounted in a rotary manner in order to rotate around a rotation axis so that, by rotating each time by 180° around the rotation axis, the secondary body shows, through the first through opening of the main body, its first face or, alternatively, its second face.

20 Claims, 7 Drawing Sheets

(52) U.S. Cl.
CPC .... *B60K 2360/28* (2024.01); *B60K 2360/698* (2024.01); *B62D 1/04* (2013.01)

(58) Field of Classification Search
CPC .. B60K 2360/695; B60K 35/28; B60K 35/60; B60K 2360/1523; B60K 2360/1526; B60K 2360/167; B60K 35/22; B62D 1/04
See application file for complete search history.

(56) References Cited

U.S. PATENT DOCUMENTS

| | | | | |
|---|---|---|---|---|
| 4,568,117 | A * | 2/1986 | McElfish | B60R 7/04 224/280 |
| 4,706,810 | A * | 11/1987 | Petrilli | B63B 49/00 296/70 |
| 4,814,759 | A * | 3/1989 | Gombrich | G06F 1/1601 345/905 |
| 5,080,516 | A * | 1/1992 | Ward | G06F 3/0224 40/503 |
| 5,102,181 | A * | 4/1992 | Pinkney | B60K 35/60 312/305 |
| 6,157,418 | A * | 12/2000 | Rosen | B60K 35/60 248/921 |
| 6,305,809 | B1 * | 10/2001 | Zadro | G02B 5/10 359/872 |
| 6,474,431 | B1 * | 11/2002 | Baker | B60K 35/10 296/70 |
| 6,568,345 | B1 | 5/2003 | Paulo | |
| 6,756,697 | B2 * | 6/2004 | Mizutani | B60R 11/02 307/10.1 |
| 6,996,940 | B2 * | 2/2006 | Beasley | A47B 49/00 52/65 |
| 7,111,883 | B1 * | 9/2006 | Patel | B60R 7/04 296/37.8 |
| 7,885,060 | B2 * | 2/2011 | Douglas | G06F 1/1649 345/173 |
| 8,558,681 | B2 * | 10/2013 | Nishiyama | B60K 35/22 116/288 |
| 10,179,088 | B2 * | 1/2019 | Duncan | A61H 33/066 |
| 10,647,264 | B2 * | 5/2020 | Forsgren | B60K 35/50 |
| 12,083,964 | B2 * | 9/2024 | Rook | B60K 35/215 |
| 12,391,119 | B2 * | 8/2025 | Ive | B60K 35/00 |
| 12,485,758 | B2 * | 12/2025 | Ive | B60K 35/50 |
| 12,565,099 | B2 * | 3/2026 | Ive | B60K 35/00 |
| 2005/0212669 | A1 | 9/2005 | Ono et al. | |
| 2008/0252555 | A1 * | 10/2008 | Jeon | G06F 1/1616 345/1.1 |
| 2010/0088934 | A1 * | 4/2010 | Mungia | G09F 21/04 40/591 |
| 2016/0016472 | A1 * | 1/2016 | Konishi | G01D 11/28 345/633 |
| 2017/0192531 | A1 * | 7/2017 | Sanchez Lopez | B60K 35/215 |

FOREIGN PATENT DOCUMENTS

| | | | | |
|---|---|---|---|---|
| EP | 3138722 | B1 | 8/2018 | |
| FR | 2822417 | A1 * | 9/2002 | B60R 11/0264 |
| JP | 6865114 | B2 * | 4/2021 | |

OTHER PUBLICATIONS

FR-2850329-A1; Legrand, "Multifunction Storage Device for Automobile Comprises Casing Located Behind Opening of Trim Element in Driving Compartment and Supports Several Functional Units Which Can Be Brought Opposite Opening for Accessibility", 2004. (Year: 2004).*
BR-PI0402006-A; Denilson, "Turn, Communication and Advertising Vehicle", 2005. (Year: 2005).*
DE-10331131-A1; Sues et al. "Instrument Cluster", 2005. (Year: 2005).*
GB-2555479-A; Crijns, "Moveable Display Screen", 2018. (Year: 2018).*
FR-2833541-A1; Lecharpy "Layout of Instruments in Automobile Dashboard Comprises Rail on Which Instruments Are Slid Arranged in Well Defined Part in Driver's Field of Vision", 2003. (Year: 2003).*
Italian Search Report for Application No. 202200022764 ; Filing Date: Nov. 4, 2022; Date of Mailing: May 9, 2023; 6 pages.

* cited by examiner

CONTROL PANEL WITH A REVERSIBLE SCREEN FOR A VEHICLE

CROSS-REFERENCE TO RELATED APPLICATIONS

This patent application claims priority from Italian patent application no. 102022000022764 filed on Nov. 4, 2022, the entire disclosure of which is incorporated herein by reference.

TECHNICAL FIELD

The present invention relates to a control panel for a vehicle.

The present invention can be advantageously implemented in the control panel of a car, to which the following description will make explicit reference without any consequent loss in generality.

PRIOR ART

A car comprises a dashboard, which constitutes the front wall of the passenger compartment located below the windscreen. The dashboard supports a control panel, which is arranged in front of the driver immediately behind the steering wheel.

In the past, the control panel only comprised analogue instruments with needles and a few indicator lights; gradually small digital screens appeared, which over time became increasingly larger and more defined to show images of increasing complexity until they became fully programmable. Digital displays initially replaced the odometer and some indicator lights, subsequently they replaced the secondary analogue instruments (such as, for example, the residual fuel indicator and the clock), and finally in some cases they replaced the main analogue instruments (i.e. the speedometer and rev counter) as well, thus realizing a fully digital instrumentation.

The fully digital instrumentation is normally greatly appreciated in "relaxed" driving (particularly in the city) since, being fully programmable, it allows useful driving information to be highlighted (for example, the speed of the vehicle, which is indispensable information for complying with the limits imposed by the law, and the navigation system) in such a manner that the useful driving information is readily and immediately readable without it being necessary to take one's eyes off the road for too long. However, the fully digital instrumentation is generally less appreciated in "sports" driving, particularly in track driving, inasmuch as it is deemed harder to read with immediacy (i.e. it requires more attention to acquire the information displayed by the instrumentation, as a quick glance is generally not sufficient) .

In the high-performance s cars currently in production, a compromise is normally chosen which provides the presence of a single analogue instrument that indicates the rpm of the engine (i.e. a rev counter) flanked by one or two digital screens; however, this solution is a compromise that generally adversely affects both the analogue instrument (which cannot be very large so as not to take away too much space from the digital screens) and the digital screens (which necessarily have relatively small dimensions so as not to overlap with the analogue instrument and are thus poorly suited to showing a detailed map navigation system, which, however, is highly appreciated especially in city driving).

The patent EP3138722B1 describes a control panel comprising a digital screen and an analogue instrument provided with a circular support element and a needle that moves within the support element; the analogue instrument is movable so as to be arranged only when needed in a working position, in which the analogue instrument overlaps the digital screen in such a manner that the support element of the analogue instrument covers a corresponding part of said digital screen.

The patent application US2005212669A1 describes a display apparatus for a vehicle comprising a screen with a plurality of display areas.

The patent U.S. Pat. No. 6,568,345B1 describes a control panel comprising multiple instrument clusters with differently arranged display devices. The instrument clusters are mounted on a single support or frame, which is mounted in a rotary manner so as to be selectable and viewable one at a time behind a display surface.

DESCRIPTION OF THE INVENTION

The object of the present invention is to provide a control panel for a vehicle which allows information to be displayed in a manner that the driver can, in all driving situations, obtain the data he or she needs with a minimum amount of distraction.

According to the present invention, a control panel for a vehicle is provided as claimed in the accompanying claims.

The claims describe preferred embodiments of the present invention and form an integral part of the present description.

BRIEF DESCRIPTION OF THE DRAWINGS

The present invention will now be described with reference to the accompanying figures, which illustrate non-limiting embodiments thereof, wherein.

PREFERRED EMBODIMENTS OF THE INVENTION

Figure 1:
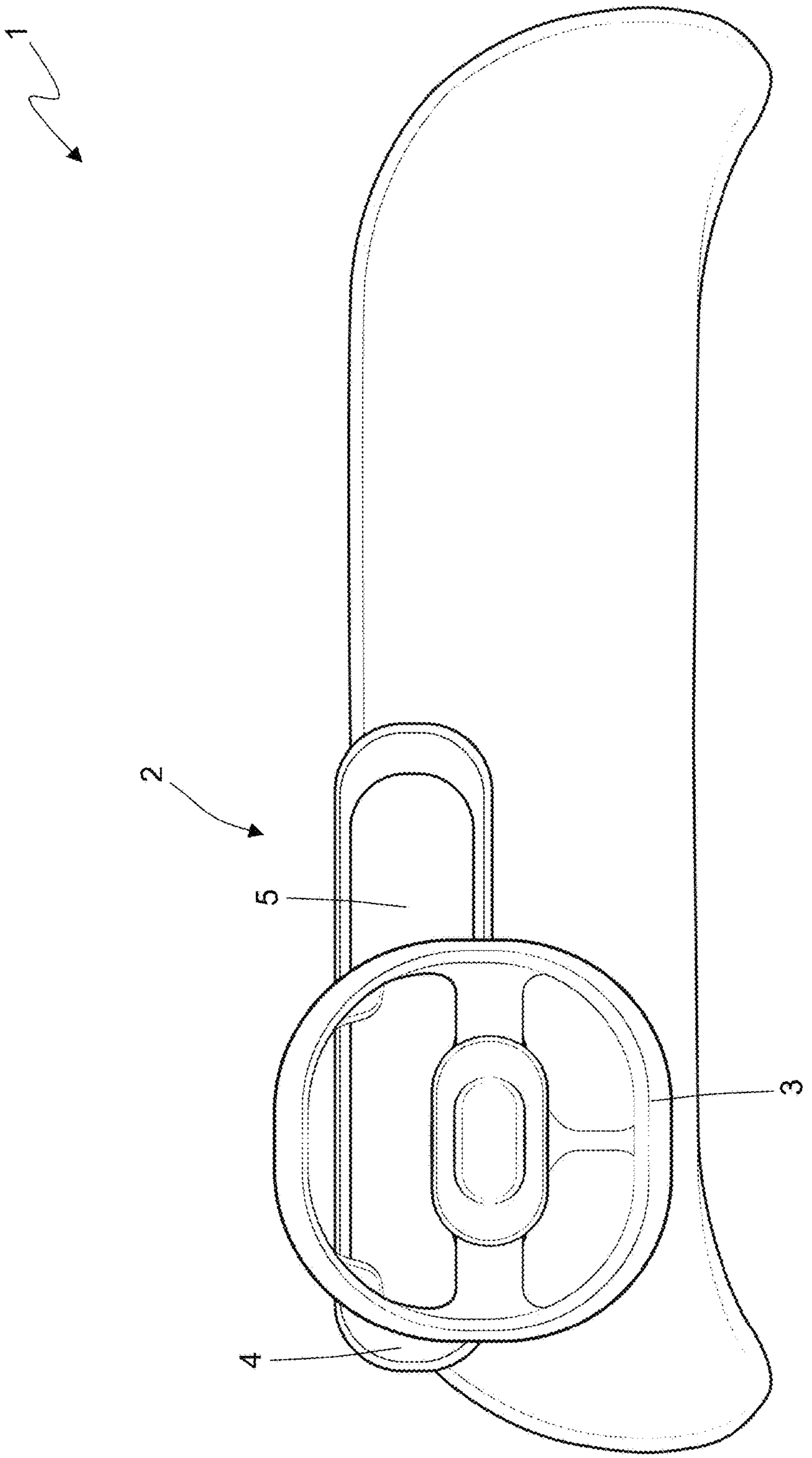
FIG. 1 is a schematic view of part of a dashboard of a car provided with a control panel realized according to the present invention.

In FIG. 1, the reference number 1 indicates, as a whole, the dashboard of a car.

The dashboard 1 supports a control panel 2, which is arranged in front of the driver behind a steering wheel 3. In particular, the control panel 2 is arranged above a support body that internally houses the steering column (i.e. the element at one end of which the steering wheel 3 is mounted).

The control panel 2 comprises a box-type housing 4, which has a substantially parallelepiped shape (having rounded edges) and is cup-shaped in order to contain all components of the control panel 2 within it; in particular, the housing 4 has an open end that faces the steering wheel 3 (i.e. the driver) and is closed by a transparent panel 5 that reproduces the shape of the housing 4 so as to engage the entire area of the housing 4. According to a preferred embodiment, the housing 4 comprises a connecting element that protrudes cantilevered from a lower wall of the housing 4 and is configured to attach the housing 4 to the dashboard 1 of the vehicle; in particular, the connecting element is a ring that is fit around a cylindrical support of the dashboard 1.

According to the illustration shown in FIG. 2, the control panel 2 comprises a flat main body 6 (i.e. a plate) which is fixed inside the housing 4 below the transparent panel 5 (i.e. at a certain distance from the transparent panel 5) and reproduces the shape of the housing 4 in order to engage the entire area of the housing 4. The main body 6 has a single through opening 7 that is obtained within the main body 6 and is completely surrounded by the main body 6.

According to a preferred embodiment illustrated in the accompanying figures, the through opening 7 obtained through the main body 6 has a circular (round) shape; according to a different embodiment not illustrated, the through opening 7 obtained through the main body 6 has a shape different from a round shape (e.g., a rectangular shape, an elliptical shape, or a polygonal shape).

Figure 2:
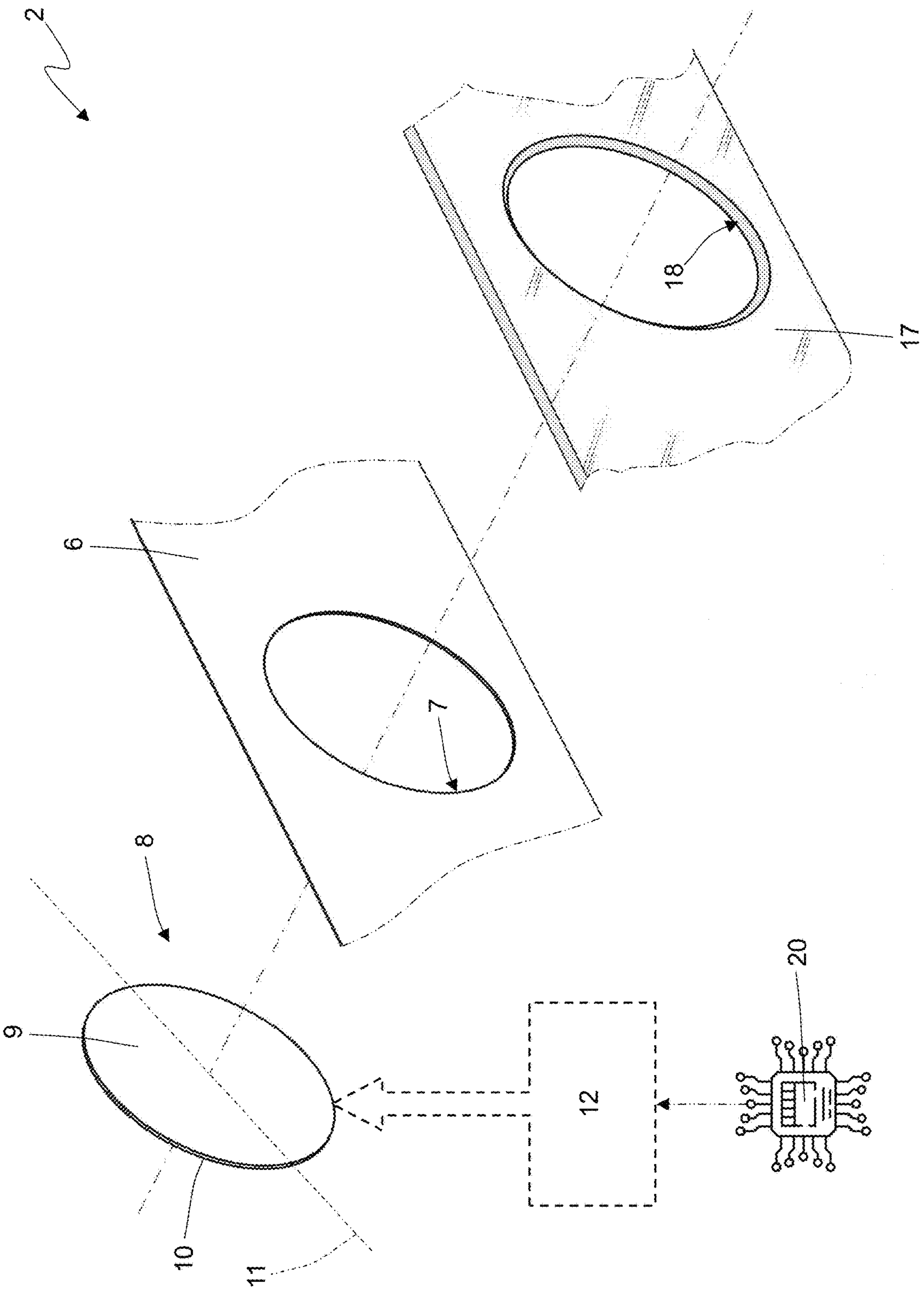
FIG. 2 is a schematic, perspective and exploded view of a part of the control panel of FIG. 1.

According to the illustration shown in FIG. 2, the control panel 2 comprises a flat secondary body 8 (i.e. a plate) which has the same shape and (substantially) the same size as the through opening 7 of the main body 6, has a face 9 and a face 10 opposite one another, and is arranged in the area of the through opening 7 of the main body 6 (i.e. is arranged through the through opening 7 of the main body 6 in order to be completely visible through the through opening 7 of the main body 6).

The secondary body 8 is mounted in a rotary manner in order to rotate around a rotation axis 11 (and inside the through aperture 7) so that, by rotating each time by 180° around the rotation axis 11, the secondary body 8 shows, through the through opening 7 of the main body 6, its face 9 or, alternatively, its face 10. The rotation axis 11 is coplanar with the main body 6, i.e. it lies in the main body 6. In other words, the secondary body 8 is able to rotate around the rotation axis 11 inside the through opening 7, therefore the secondary body 8 has a size that is substantially the same (to minimize the clearance) as a size of the through opening 7 but is in fact slightly smaller than the size of the through opening 7 in order to allow the rotation of the secondary body 8 inside the through opening 7.

In the embodiment illustrated in the accompanying figures, the rotation axis 11 is horizontal; alternatively, the rotation axis 11 can be vertical or inclined (e.g., 45°) with respect to either the horizontal or the vertical.

According to the illustration shown in FIG. 2, the control panel 2 comprises an actuator device 12 (typically an electric motor), which is configured to rotate the secondary body 8 around the rotation axis 11 with rotations having, each time, an angular range of 180° (thus intended to cyclically invert the face 9 or 10 facing the through opening 7 of the main body 6, i.e. visible through the through opening 7 of the main body 6).

Figure 3:
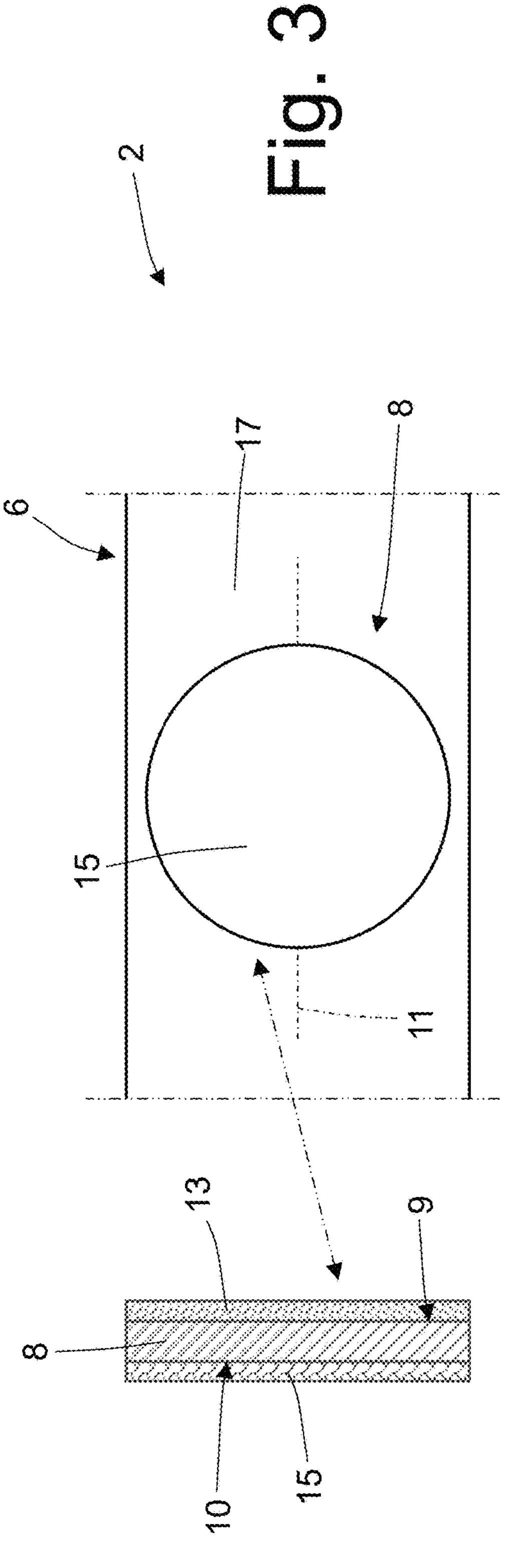
FIGS. 3 and 4 are two schematic front views of a part of the control panel of FIG. 1 in two different configurations.
Figure 4:
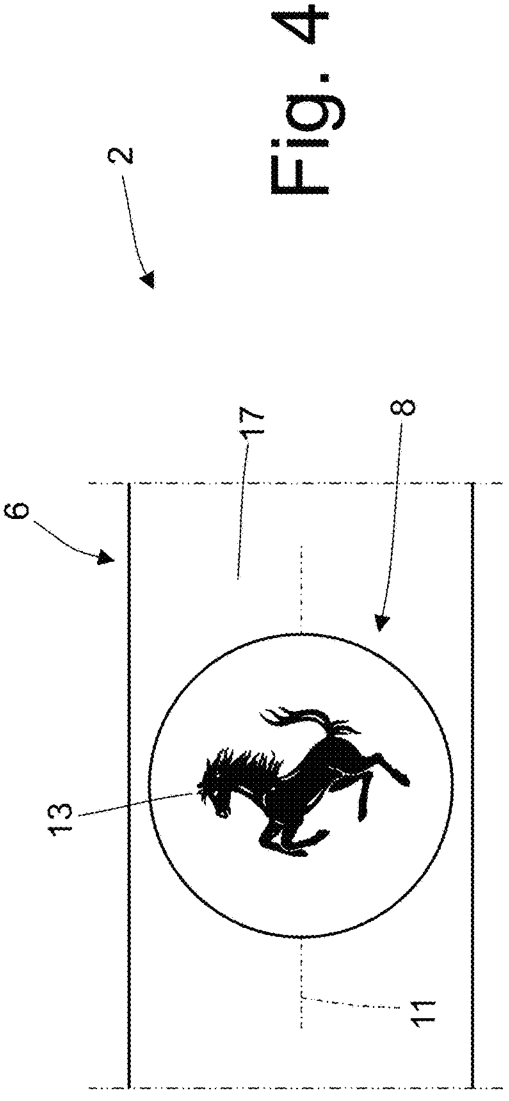

The face 9 of the secondary body 8 can support a potentially embossed printed image 13 or a predefined graphic representation that is static, i.e. not modifiable in any way as illustrated in FIGS. 3 and 4. Alternatively, the face 9 of the secondary body 8 can support an analogue instrument 14 provided with at least one needle as illustrated in FIGS. 5-12.

Figure 5:
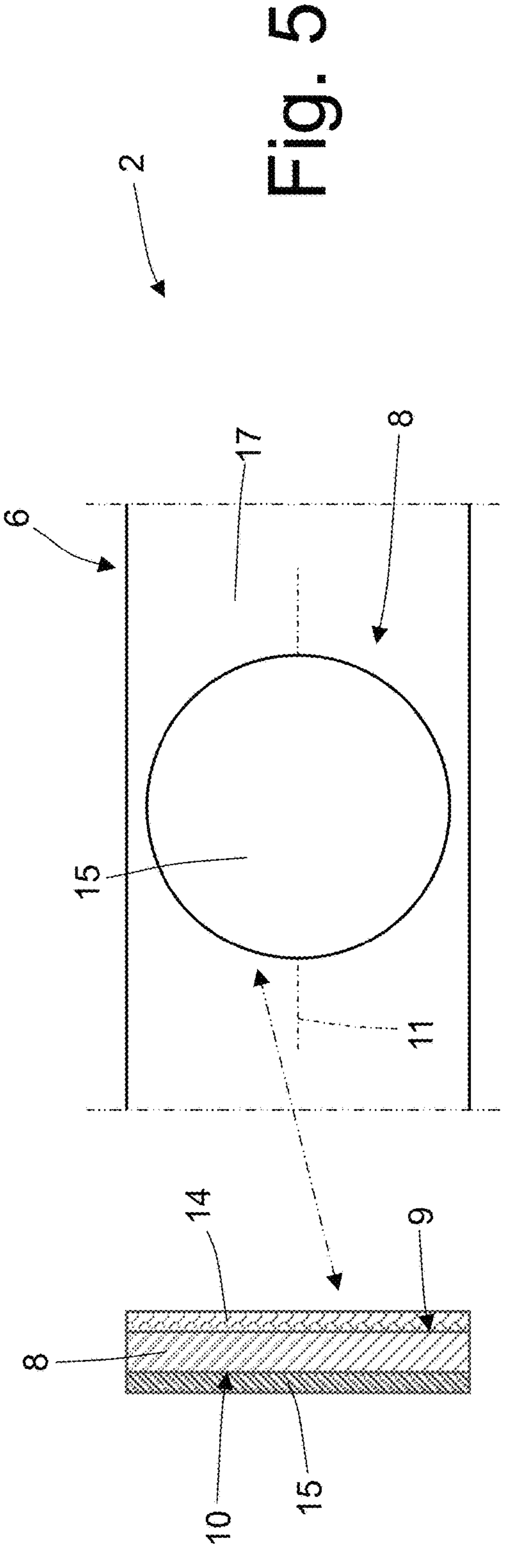
FIGS. 5 and 6 are two schematic front views of a part of a first variant of the control panel of FIG. 1 in two different configurations.
Figure 7:
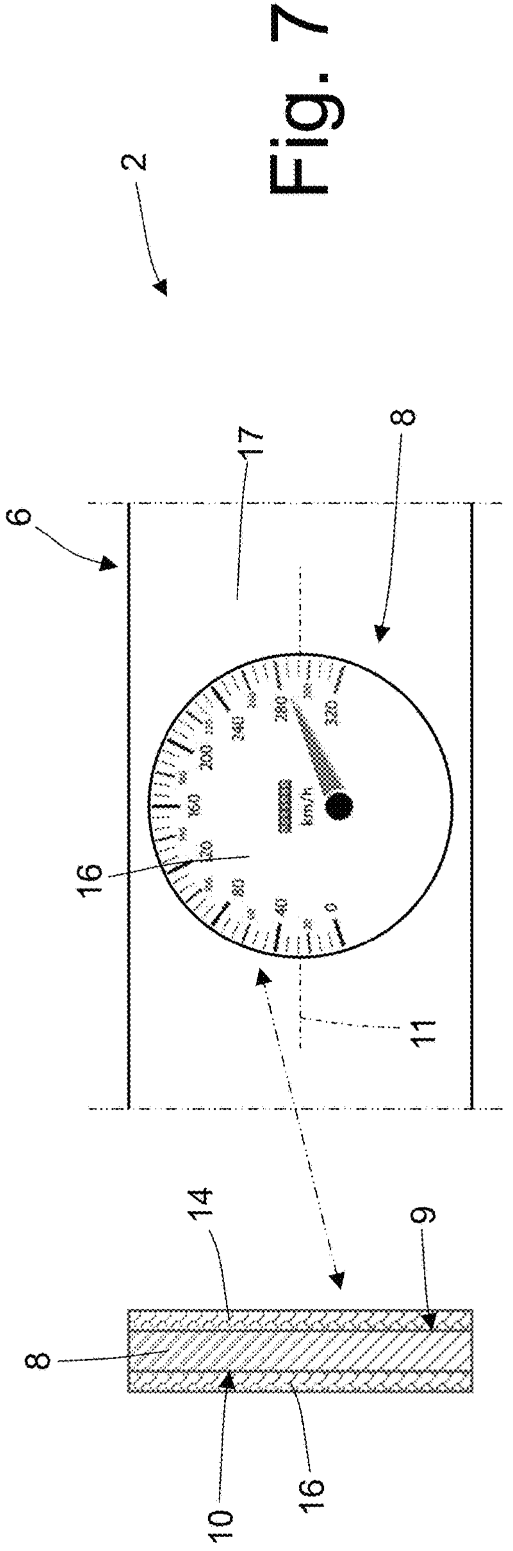
FIGS. 7 and 8 are two schematic front views of a part of a second variant of the control panel of FIG. 1 in two different configurations.
Figure 9:
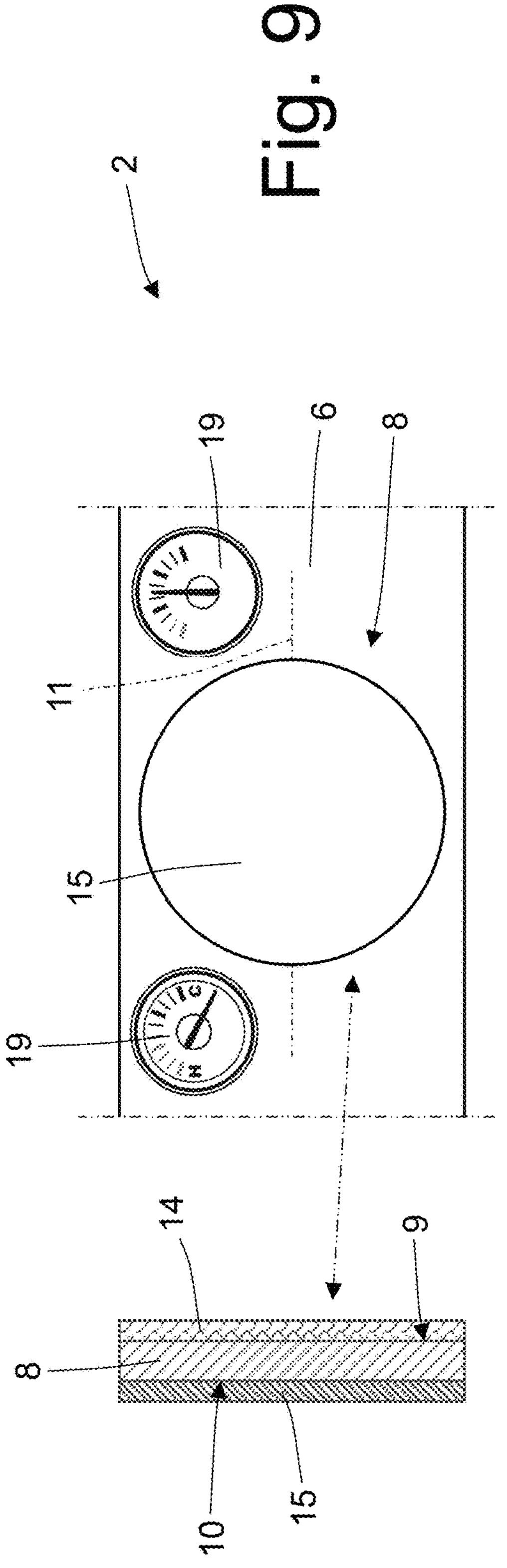
FIGS. 9 and 10 are two schematic front views of a part of a third variant of the control panel of FIG. 1 in two different configurations.

The face 10 of the secondary body 8 can support a digital screen 15 (for example produced with LED technology or OLED technology) as illustrated in FIGS. 3, 5 and 9; preferably, the digital screen 15 takes up the entire surface area of the face 10 of the secondary body 8 and thus has the same shape and the same size as the secondary body 8. Alternatively, the face 10 of the secondary body 8 can support an analogue instrument 16, which is provided with at least one needle and is different and independent from the analogue instrument 14 supported by the face 9 as illustrated in FIGS. 7 and 11.

As illustrated in FIGS. 2-8, the main body 6 can support at least one digital screen 17 (for example produced with LED technology or OLED technology), which overlaps the through opening 7 of the main body 6 and has its own through opening 18 (illustrated in FIG. 2), which is completely surrounded by the digital screen 17, is aligned with the through opening 7 of the main body 6 and has the same shape and the same size as the through opening 7 (so that the through opening 7 of the main body 6 and thus the secondary body 8 located at the through opening 7 are completely visible through the through opening 18 of the digital screen 17). According to a different embodiment not illustrated, the digital screen 17 supported by the main body 6 is arranged beside the through opening 7 of the main 6 body without overlapping the through opening 7 (the digital screen 17 thus does not have any through openings 18 because it does not overlap the through opening 7 of the main body 6); in this case, there could be two (or more) digital screens 17 present, supported by the main body 6 and arranged beside the through opening 7 of the main body 6 without overlapping the through opening 7.

Figure 10:
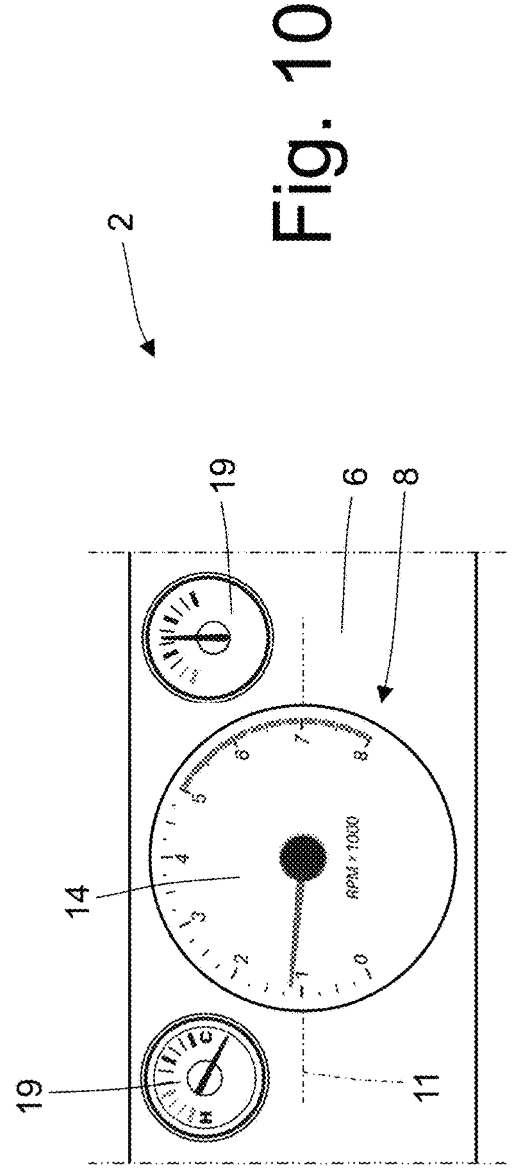
Figure 11:
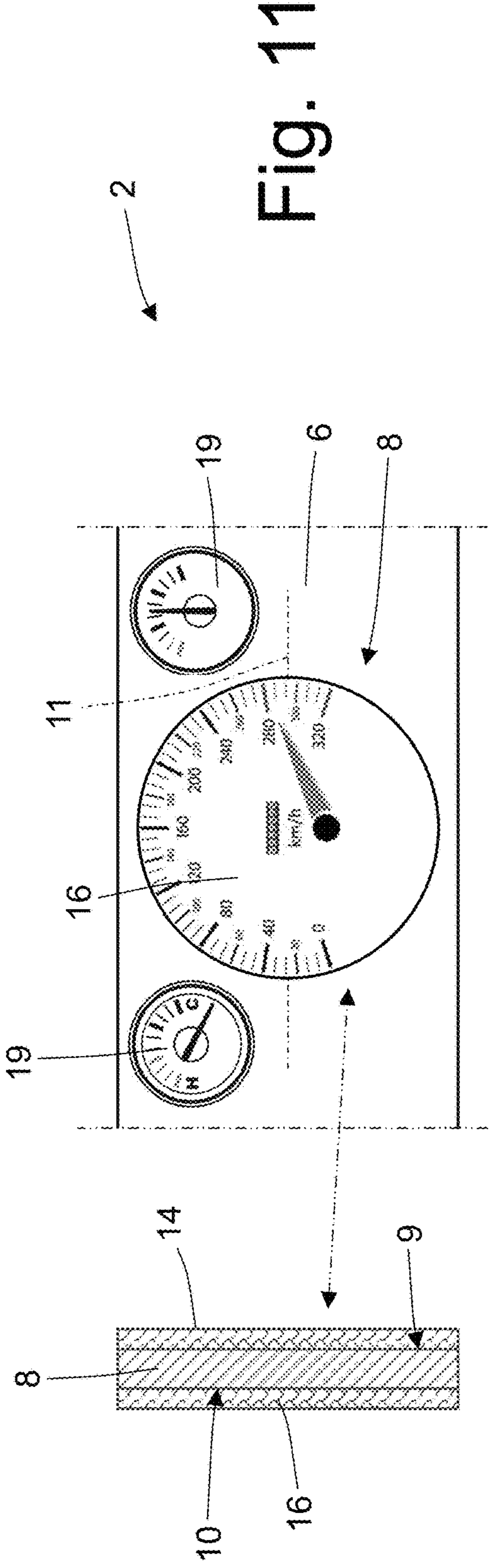
FIGS. 11 and 12 are two schematic front views of a part of a fourth variant of the control panel of FIG. 1 in two different configurations.

According to the embodiment illustrated in FIGS. 9-12, the main body 6 supports at least one analogue instrument 19, which is provided with at least one needle and is arranged beside the through opening 7 of the main body 6 without overlapping the through opening 7. In this embodiment, the main body 6 can also support the digital screen 17 arranged beside the through opening 7 of the main body 6 and the analogue instrument 19 (i.e. not overlapping the through opening 7 of the main body 6 and the analogue instrument 19) or, alternatively, the main body 6 does not include the digital screen 17 (i.e. supports only the analogue instruments 19). Moreover, in this embodiment, the face 9 of the secondary body 8 can support the printed image 13 or can support the analogue instrument 14 (as illustrated in FIGS. 9-12) while the face 10 of the secondary body 8 can support the digital screen 15 (as illustrated in FIG. 9) or can support the analogue instrument 16 (as illustrated in FIG. 11).

Summarizing the above, the control panel 2 can have a completely digital version that is encountered when the digital screen 17 that covers (entirely) the visible surface of the main body 6 is flanked by the digital screen 15 carried by the secondary body 8 to form almost seamlessly a digital screen that occupies the entire area of the control panel 2 (as illustrated in FIGS. 3 and 5).

Figure 6:
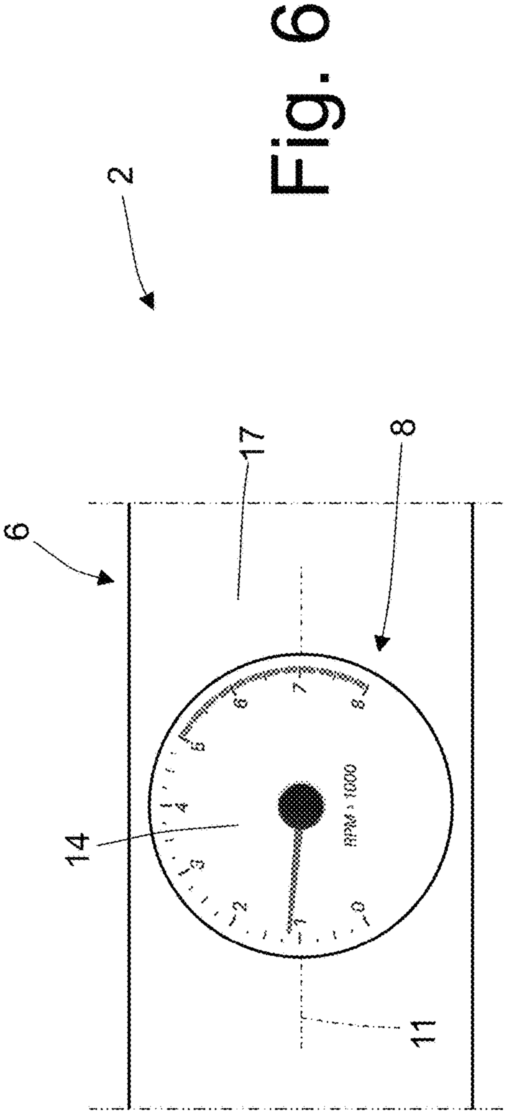
Figure 8:
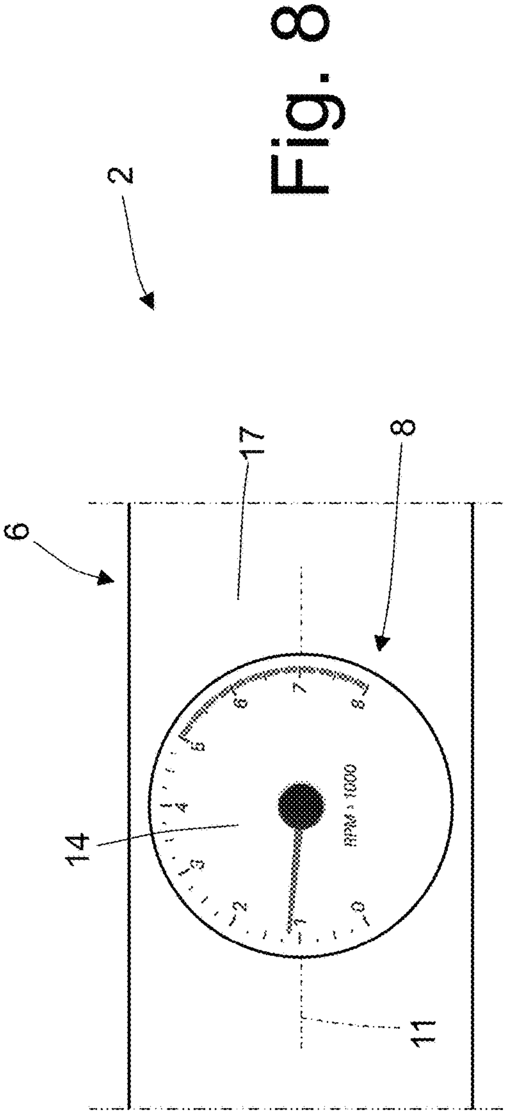

Summarizing the above, the control panel 2 can have a hybrid version (digital and analogue) in which the digital screen 17 that covers (entirely) the visible surface of the main body 6 is flanked by the analogue instrument 14 or 16 carried by the secondary body 8 (as illustrated in FIGS. 6, 7 and 8) or in which the digital screen 15 carried by the secondary body 8 is flanked by the analogue instruments 19 mounted on the main body 6 (as illustrated in FIG. 9).

Figure 12:
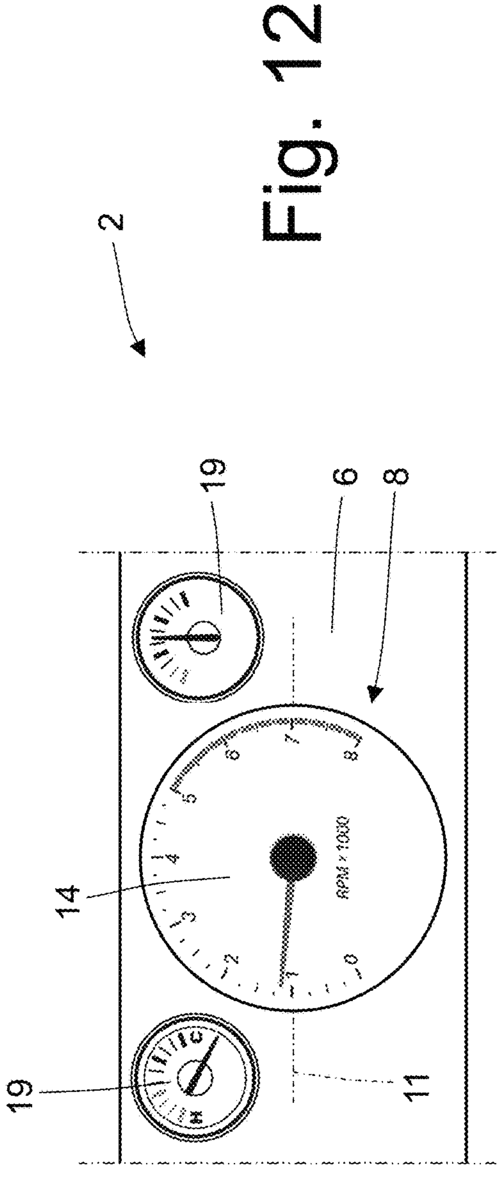

Summarizing the above, the control panel 2 can have a completely analogue version in which the analogue instruments 19 mounted on the main body 6 are flanked by the analogue instrument 14 or 16 carried by the secondary body 8 (as illustrated in FIGS. 10, 11 and 12).

According to the illustration shown in FIG. 2, the control panel 2 comprises a control unit 20 configured to arrange the secondary body 8 so as to show, through the through opening 7 of the main body 6, a face 9 or 10 of the secondary body 8 when the vehicle is turned off (i.e. when the vehicle is in the so-called "KEY-OFF" condition) and so as to show, through the through opening 7 of the main body 6, the other face 10 or 9 of the secondary body 8 when the vehicle is turned on (i.e. when the vehicle is in the so-called "KEY-ON" condition). This control mode is normally used when the face 9 of the secondary body 8 supports the printed image 13 (which distinguishes and identifies the vehicle off condition), but it could also be used when the face 9 of the secondary body 8 supports the analogue instrument 16.

The control unit 20 can be configured to arrange the secondary body 8 so as to show, through the through opening 7 of the main body 6, a face 9 or 10 of the secondary body 8 in a road driving mode (i.e. designed for use on roads open to the public and subject to the limits imposed by the traffic code) and so as to show, through the through opening 7 of the main body 6, the other face 10 or 9 of the secondary body 8 in a performance driving mode (i.e. designed for use in circuit driving). For example, in the embodiment illustrated in FIGS. 5-6 and 9-10, the digital screen 15 is shown in the road driving mode and the analogue instrument 14 (typically a rev counter) is shown in the performance driving mode; or, in the embodiment illustrated in FIGS. 7-8 and 11-12, the analogue instrument 16 (typically a speedometer and odometer) is shown in the road driving mode and the analogue instrument 14 (typically a rev counter) is shown in the performance driving mode.

The control unit 20 can be configured to arrange the secondary body 8 in the position desired by the driver independently of the state (turned on or turned off) of the vehicle and independently of the driving mode set by the driver.

According to the embodiment illustrated in the accompanying figures, the main body 6 has a single through opening 7 engaged by the secondary body 8. According to other embodiments not illustrated, the main body 6 has multiple through openings 7 each engaged by a corresponding secondary body 8. For example, there can be a larger through opening 7 arranged in the center and two or more smaller through openings 7 arranged on the sides; or there can be two (or more) larger through openings 7 arranged in the center and possibly some smaller through openings 7 arranged on the sides (also having sizes different from one another).

The embodiments described herein can be combined with one another without departing from the scope of protection of the present invention.

The above-described control panel 2 can be implemented advantageously in any type of road vehicle (such as a car or a motorcycle) as well as in any type of non-road vehicle.

The above-described control panel 2 has numerous advantages.

First of all, the above-described control panel 2 allows information to be displayed in such a manner that the driver can obtain, in all driving situations, the data he or she needs with a minimum amount of distraction. This result is achieved thanks to the fact that, depending on the driving situation and/or the wishes of the driver, the information can be displayed in a differentiated manner using different display means (by rotating the secondary body 8 by 180°, it is possible to invert the face 9 or 10 of the secondary body 8 visible through the through opening 7 of the main body 6, whereby it is possible to modify the display means arranged in the control panel 2 in front of the driver).

In this regard, it is important to note that the information displayed in a completely digital form can be more complete and more detailed, while the information displayed in an analogue form is less complete and less detailed but perceptible more rapidly (it being sufficient to see the position of the needles without actually reading the numerical scale associated with the needles). It would also be possible to reproduce the needles digitally; however, it has been demonstrated that the visibility of a physical needle is far superior to the visibility of a needle displayed on a digital screen (in particular because the physical needle creates a three-dimensionality that makes it easier to see the physical needle).

In other words, the above-described control panel 2 allows information to be displayed using only the digital screens 15 and 17 when the driver requires the presentation of complex information (typically a map navigation system during "relaxed" driving) and also allows an analogue instrument 14 to be used when the driver requires this type of instrumentation for "sports" driving. In other words, the above-described control panel 2 is not a bad compromise between the need to have a large digital screen and the conflicting need to also have a large analogue instrument; in fact, the above-described control panel 2 makes it possible to have (at different times) both a large digital screen and an analogue instrument as a function of the wishes of the driver.

Moreover, the above-described control panel 2 has a particularly contained bulk so that it can be integrated in any type of vehicle.

Finally, the above-described control panel 2 has a relatively low production cost inasmuch as it uses simple components that are readily available on the market.

LIST OF REFERENCE NUMBERS IN THE FIGURES

1 dashboard
2 control panel
3 steering wheel
4 housing
5 transparent panel
6 main body
7 through opening
8 secondary body
9 face
10 face
11 rotation axis
12 actuator device
13 printed image
14 analogue instrument
15 digital screen
16 analogue instrument
17 digital screen
18 through opening
19 analogue instrument
20 control unit

The invention claimed is:

1. A control panel (2) for a vehicle comprising:

a main body (6) having at least one first through opening (7), which is obtained inside it and is completely surrounded by the main body (6); and a flat secondary body (8), which has the same shape as the first through opening (7) of the main body (6), has a first face (9) and a second face (10) opposite one another and is arranged in the area of the first through opening (7) of the main body (6);

wherein the secondary body (8) is mounted in a rotary manner in order to rotate around a rotation axis (11) so that, by rotating each time by 180° around the rotation axis (11), the secondary body (8) shows, through the first through opening (7) of the main body (6), its first face (9) or, alternatively, its second face (10);

wherein the rotation axis (11) is coplanar with the main body (6) and lies in the main body (6);

wherein it is provided an actuator device (12), which is configured to rotate the secondary body (8) around the rotation axis (11) with rotations having, each time, an angular range of 180°;

wherein the first face and the second face (9; 10) of the secondary body (8) supports at least one first analogue instrument (14; 16) provided with at least one needle.

2. The control panel (2) according to claim 1 and comprising a control unit (20) configured to arrange the secondary body (8) so as to show, through the first through opening (7) of the main body (6), a face (9; 10) of the secondary body (8) when the vehicle is turned off and so as to show, through the first through opening (7) of the main body (6), the other face (10; 9) of the secondary body (8) when the vehicle is turned on.

3. The control panel (2) according to claim 1 and comprising a control unit (20) configured to arrange the secondary body (8) so as to show, through the first through opening (7) of the main body (6), a face (9; 10) of the secondary body (8) in a road driving mode and so as to show, through the first through opening (7) of the main body (6), the other face (10; 9) of the secondary body (8) in a performance driving mode.

4. The control panel (2) according to claim 1, wherein the first face (9) of the secondary body (8) supports a printed image (13) and the second face (10) of the secondary body (8) supports the first analogue instrument (16).

5. The control panel (2) according to claim 1, wherein the first face (9) of the secondary body (8) supports the first analogue instrument (14).

6. The control panel (2) according to claim 1, wherein the first face (9) of the secondary body (8) supports a digital screen (15) and the second face (10) of the secondary body (8) supports the first analogue instrument (16).

7. The control panel (2) according to claim 1, wherein the second face (10) of the secondary body (8) supports the first analogue instrument (16).

8. The control panel (2) according to claim 1, wherein the main body (6) supports at least one digital screen (17), which is arranged beside the first through opening (7) without overlapping the first through opening (7).

9. The control panel (2) according to claim 1, wherein:

the main body (6) supports at least one digital screen (17); and, the digital screen (17) overlaps the first through opening (7) and has a second through opening (18), which is aligned with the first through opening (7) and has the same shape and the same size as the first through opening (7).

10. The control panel (2) according to claim 1, wherein the main body (6) supports at least one second analogue instrument (19), which is provided with at least one needle and is arranged beside the first through opening (7) without overlapping the first through opening (7).

11. The control panel (2) according to claim 1 and comprising a main transparent panel (5), which covers the main body (6) and is arranged at a given distance from the main body (6) so as not to interfere with the rotation of the secondary body (8).

12. A control panel (2) for a vehicle comprising:

a main body (6) having at least one first through opening (7), which is obtained inside it and is completely surrounded by the main body (6); and a flat secondary body (8), which has the same shape as the first through opening (7) of the main body (6), has a first face (9) and a second face (10) opposite one another and is arranged in the area of the first through opening (7) of the main body (6);

wherein the secondary body (8) is mounted in a rotary manner in order to rotate around a rotation axis (11) so that, by rotating each time by 180° around the rotation axis (11), the secondary body (8) shows, through the first through opening (7) of the main body (6), its first face (9) or, alternatively, its second face (10);

wherein the rotation axis (11) is coplanar with the main body (6), and lies in the main body (6);

wherein it is provided an actuator device (12), which is configured to rotate the secondary body (8) around the rotation axis (11) with rotations having, each time, an angular range of 180°;

wherein the main body (6) supports at least one digital screen (17) above the main body (6) without overlapping the first through opening (7);

wherein the first face and the second face (9; 10) of the secondary body (8) supports at least one first analogue instrument (14; 16) provided with at least one needle.

13. The control panel (2) according to claim 12, wherein the digital screen (17) has a second through opening (18), which is aligned with the first through opening (7) and has the same shape and the same size as the first through opening (7).

14. The control panel (2) according to claim 12 and comprising a main transparent panel (5), which covers the main body (6) and is arranged at a given distance from the main body (6) so as not to interfere with the rotation of the secondary body (8).

15. A control panel (2) for a vehicle comprising:

a main body (6) having at least one first through opening (7), which is obtained inside it and is completely surrounded by the main body (6); and a flat secondary body (8), which has the same shape as the first through opening (7) of the main body (6), has a first face (9) and a second face (10) opposite one another and is arranged in the area of the first through opening (7) of the main body (6);

wherein the secondary body (8) is mounted in a rotary manner in order to rotate around a rotation axis (11) so that, by rotating each time by 180° around the rotation axis (11), the secondary body (8) shows, through the first through opening (7) of the main body (6), its first face (9) or, alternatively, its second face (10);

wherein it is provided an actuator device (12), which is configured to rotate the secondary body (8) around the rotation axis (11) with rotations having, each time, an angular range of 180°;

wherein the first face and the second face (9; 10) of the secondary body (8) supports at least one first analogue instrument (14; 16) provided with at least one needle.

16. The control panel (2) according to claim 15, wherein the rotation axis (11) is coplanar with the main body (6) and lies in the main body (6).

17. The control panel (2) according to claim 15, wherein the first face (9) of the secondary body (8) supports a printed image (13) and the second face (10) of the secondary body (8) supports the first analogue instrument (16).

18. The control panel (2) according to claim 15, wherein the first face (9) of the secondary body (8) supports a digital screen (15) and the second face (10) of the secondary body (8) supports the first analogue instrument (16).

19. The control panel (2) according to claim 15, wherein the main body (6) supports at least one digital screen (17), which is arranged beside the first through opening (7) without overlapping the first through opening (7).

20. The control panel (2) according to claim 15, wherein:

the main body (6) supports at least one digital screen (17); and the digital screen (17) overlaps the first through opening (7) and has a second through opening (18), which is aligned with the first through opening (7) and has the same shape and the same size as the first through opening (7).

* * * * *